United States Patent
Ima

(10) Patent No.: US 6,202,781 B1
(45) Date of Patent: Mar. 20, 2001

(54) POWER STEERING DEVICE FOR VEHICLES

(75) Inventor: Akihiro Ima, Osaka-fu (JP)

(73) Assignee: Kanzaki Kokyukoki Mfg. Co., Ltd., Hyogo-ken (JP)

( * ) Notice: Subject to any disclaimer, the term of this patent is extended or adjusted under 35 U.S.C. 154(b) by 0 days.

(21) Appl. No.: 09/187,632

(22) Filed: Nov. 6, 1998

(30) Foreign Application Priority Data

Nov. 28, 1997 (JP) .................................................. 9-327343

(51) Int. Cl.$^7$ .................................................. B60K 17/30
(52) U.S. Cl. .......................... 180/252; 180/477; 180/434; 180/435; 180/436; 280/93.502; 280/93.501
(58) Field of Search ................................. 180/252, 417, 180/434, 436, 435, 440, 132; 280/93.502, 93.51

(56) References Cited

U.S. PATENT DOCUMENTS

| | | |
|---|---|---|
| 4,037,680 | 7/1977 | Grove . |
| 4,941,543 * | 7/1990 | Ewen .............................. 180/252 X |
| 5,094,312 * | 3/1992 | Hakel .................................. 180/132 |
| 5,282,644 * | 2/1994 | Larson ................................. 180/906 |
| 5,489,114 * | 2/1996 | Ward et al. .......................... 180/906 |
| 5,544,715 * | 8/1996 | Phillips ........................... 180/417 X |
| 5,823,288 * | 10/1998 | Buff ................................ 180/417 X |
| 5,921,343 * | 7/1999 | Yamakaji ............................. 180/436 |

FOREIGN PATENT DOCUMENTS

| | | |
|---|---|---|
| 3-12612 | 3/1991 | (JP) . |
| 7-257411 | 10/1995 | (JP) . |
| 7-257412 | 10/1995 | (JP) . |
| 7-257413 | 10/1995 | (JP) . |
| 7-257414 | 10/1999 | (JP) . |

* cited by examiner

Primary Examiner—Lanna Mai
Assistant Examiner—Toan C To
(74) Attorney, Agent, or Firm—Knobee, Martens, Olson & Bear, LLP

(57) ABSTRACT

A power steering device for a vehicle includes: a wheel-steering generator adapted to be connected to an axle case comprising a differential gear and a pair of right and left axles having a common axis; right and left steering knuckles adapted to be connected to the right and left axles, respectively, to attach right and left steering wheels thereto; right and left tie rods disposed between the right steering knuckle and the right piston rod and between the left steering knuckle and the left piston rod, respectively, to transmit force from the right and left piston rods to the respective steering knuckles, thereby steering the respective wheels; and right and left coupling members which couple the right and left tie rods with the right and left piston rods, respectively. The axis of the right and left piston rods is parallel to the axis of the right and left axles, and the right and left coupling members are disposed at positions such that the axis of each tie rod is positioned between the axis of the axles and the axis of the piston rods, thereby improving steering operation and the durability of the power steering device.

8 Claims, 6 Drawing Sheets

POWER STEERING DEVICE FOR VEHICLES

BACKGROUND OF THE INVENTION

The present invention relates to a power steering device for vehicles such as tractors. Vehicles such as tractors are known wherein a cylinder for a double rod-type power steering device is attached to an axle case of a differential gear device so as to steer the steering driving wheels. Such technique is disclosed in Japanese Examined Patent Publication No. 12612/1991 and Japanese Unexamined Patent Publication No. 257411/1995.

Japanese Examined Patent Publication 12612/1991 discloses a power steering device support mechanism for front-wheel drive vehicles, wherein in order to increase the maximum swing angle of the front axle, a slot parallel to the front axle is formed at a front portion of the front axle case, and a cylinder of a power steering device is inserted in the slot. However, due to the presence of an inside wall between the differential gear housing and the pair of front axle housings and direct connections between the piston rods and tie rods, a considerably large distance inevitably exists between the front axle and the piston rods of the power steering device support mechanism disclosed therein, which increases the intersection angle between the axis of the piston rods and the axes of the tie rods during steering and consequently increases the force imparted to the piston rods perpendicularly to the axis thereof, thus causing the problems of inferior steering performance and low durability of the power steering device.

To overcome the above problems, Japanese Unexamined Patent Publication No. 257411/1996 proposes a power steering device support mechanism wherein a front axle case is divided into three parts, and a differential gear device and part of a cylinder of the power steering device are accommodated together in a center case. This arrangement decreases the distance between the axis of the front axle and that of piston rods so as to make smaller the intersection angle between the axis of the piston rods and the axes of the tie rods during steering. Thus this arrangement inhibits the application of force perpendicular to the axis of the piston rods and thereby improves steering performance and durability of the power steering device.

However, the steering device disclosed in Japanese Unexamined Patent Publication No. 257411/1996, as well as that of Japanese Unexamined Patent Publication No. 12612/1991, comprises a cylinder which penetrates a front axle case. This construction causes problems of increased costs for enlarged front axle case, complicated assembly work and troublesome maintenance due to difficulty in taking out the power steering device alone.

In consideration of the above disadvantages of the prior art, an object of the present invention is to provide a power steering device for vehicles which can be manufactured without increasing costs, is easily attached to and taken out from the axle case, and minimizes the intersection angle between the axis of piston rods and the axes of tie rods in steering operation so as to improve steering performance and durability.

SUMMARY OF THE INVENTION

To achieve the above-mentioned object, the present invention provides a power steering device for vehicles which comprises:

an axle case for housing a differential gear device and a pair of right and left axles extending from the differential gear device;

a first bracket attached to the axle case and extending therefrom in one direction longitudinal of the vehicle body;

a second bracket spaced from the first bracket axially of the axle case and attached to the axle case so as to extend in the same direction as the first bracket;

a wheel steering generator positioned at said longitudinal direction side relative to the axle case and comprising a cylinder and a pair of right and left piston rods projecting from the cylinder, the cylinder being supported in parallel to the axis of the axles by the first and second brackets;

steering knuckles supported at their outer ends by steering wheels and connected at their inner ends to the axle case rotatably around king pins;

tie rods connected at their outer ends to the inner ends of the steering knuckles and extending at their inner ends towards the inner ends of the axles;

coupling members provided in parallel with said longitudinal direction, each coupling member being connected at one end to the inner end of the tie rod and extending in said longitudinal direction and being rotatably connected to the outer end of the piston rod;

a guide bar positioned in parallel with the pair of piston rods and fixed thereto; and support members attached to the axle case and extending to the guide bar so as to support the guide bar in such a way that the guide bar is slidable with the piston rods but not tiltable vertically.

In the specification and claims, the direction extending from the front axle case to either of the front wheels is referred to as "outer direction", and the opposite direction is referred to as "inner direction".

DETAILED DESCRIPTION OF THE PREFERRED EMBODIMENTS

Preferred embodiments of the power steering device of the invention are described below with reference to the accompanying drawings, FIGS. 1–6.

Figure 1:
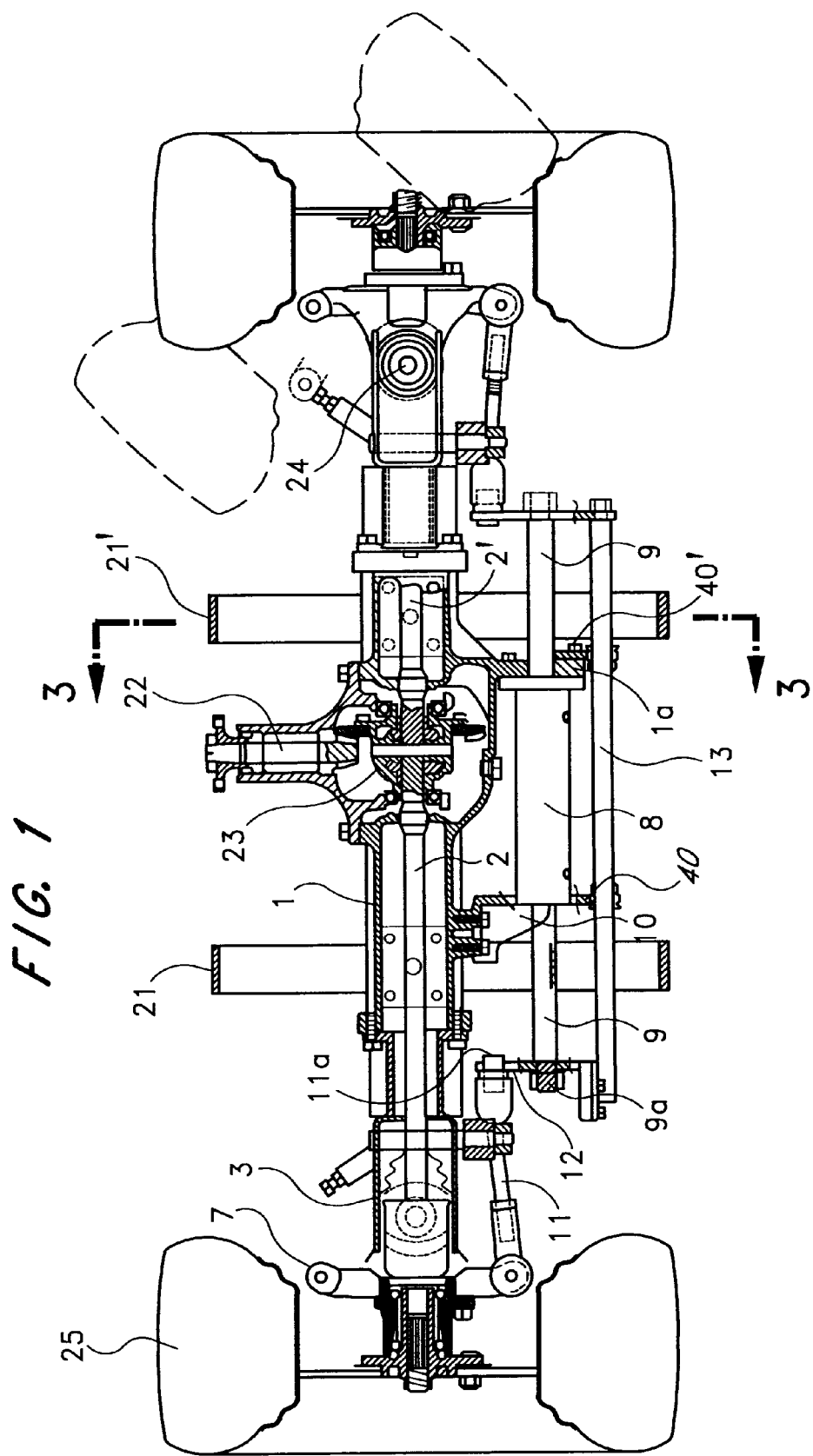
FIG. 1 is a partial cross-sectional plan view of a power steering device of a preferred embodiment of the invention.
Figure 2:
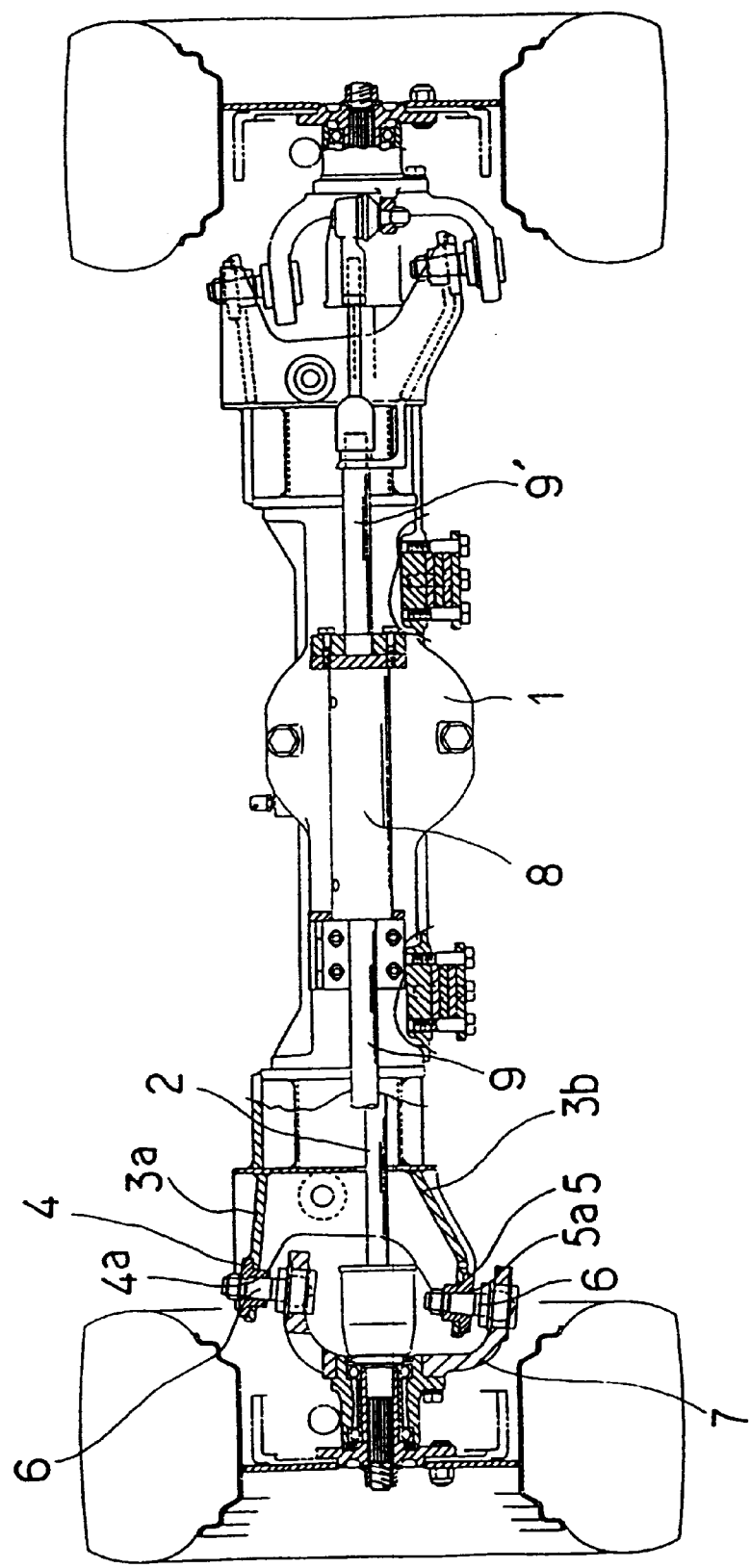
FIG. 2 is a partial cross-sectional front elevation of the power steering device illustrated in FIG. 1.
Figure 3:
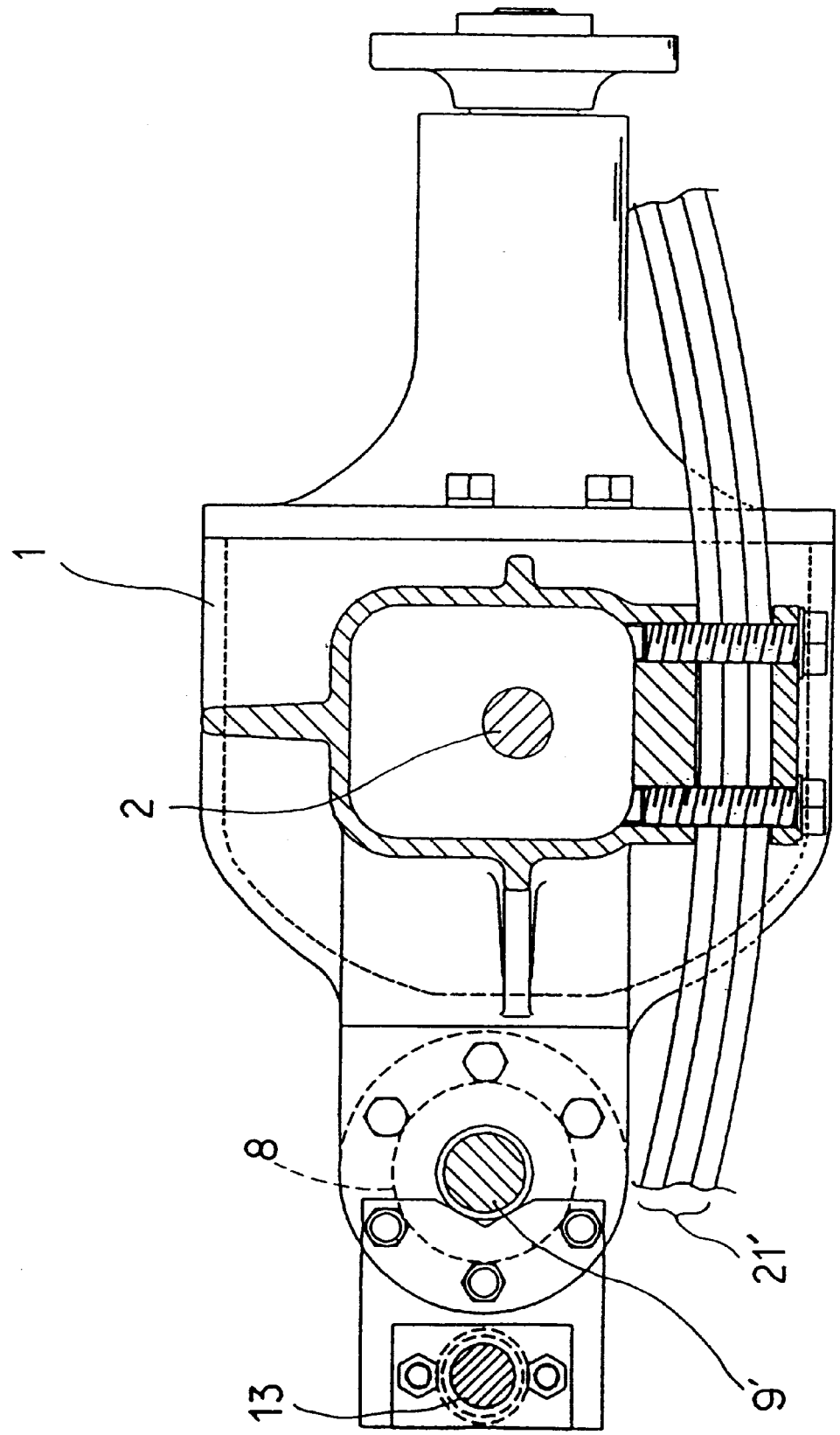
FIG. 3 is a cross-sectional view taken along line 3—3 of FIG. 1.

FIGS. 1 and 2 are a plan view and a front elevation of a power steering device of an embodiment of the invention. FIG. 3 is a cross-sectional view taken along line 3—3 of FIG. 1. As shown in FIG. 1, in a power steering device of an embodiment of the invention, an oblong front axle case 1 is mounted to extend laterally to the vehicle body on a pair of leaf springs 21, 21' which extend in parallel to the fro-to-aft direction of the vehicle body, the front axle case being fixed with bolts or like fastening members. Accommodated in the front axle case 1 are a differential gear device 23 and a pair of right and left front axles 2, 2'. The differential gear device 23 distributes the driving force from a driving shaft 22 to the right and left. The right and left front axles 2, 2' are connected to side bevel gears of the differential gear 23 at the inner ends and to right and left steering driving wheels 25, 25' at the outer ends via universal joints 24 respectively. A first bracket 1a projecting forward is integrated as a part of the front axle case 1 at a substantially central portion in the width direction of the front axle case 1. Preferably the axle case 1 is made of cast-metal to attain sufficient strength. It is further desirable that the front axle case is formed integrally by the following parts: i) a pair of right and left front axle housing portions, ii) a differential gear housing portion having a larger diameter than the front axle housing portions, iii) a pair of intermediate portions successively formed to expand radially from the inner ends of the front axle housing portions to the differential gear housing portion, and iv) a first bracket 1a projecting forward from one of the intermediate portions. Integrating the first bracket 1a as a part of the axle case at this position decreases the distance between the front end of the first bracket and the front axle case, which increases strength of the first bracket.

At both ends of the front axle case 1, yoke members 3 are fixed with bolts, the yoke members being preferably formed by bending and welding stainless steel plates or like metal plates. With formation of the yoke member 3 by a plate, it becomes easier to attach a king pin holder 4 (described later) at the precise position. An upper arm 3a and a lower arm 3b are attached to the yoke member 3 by welding or like fixing means, and the arms are provided with openings. Upper and lower holders 4, 5 for supporting king pins 6, 6 are inserted in the openings and fixed. In this embodiment, the upper holder 4 has a flange on the upper side, whereas the lower holder 5 has a flange on the lower side. With these flanges of the upper and lower holders being in contact with the upper surface of the upper arm 3a and the lower surface of the lower arm 3b respectively, the holders 4, 5 are fixed by welding or like means. In this way, the holders 4, 5 are firmly fixed on the yoke members.

Figure 4:
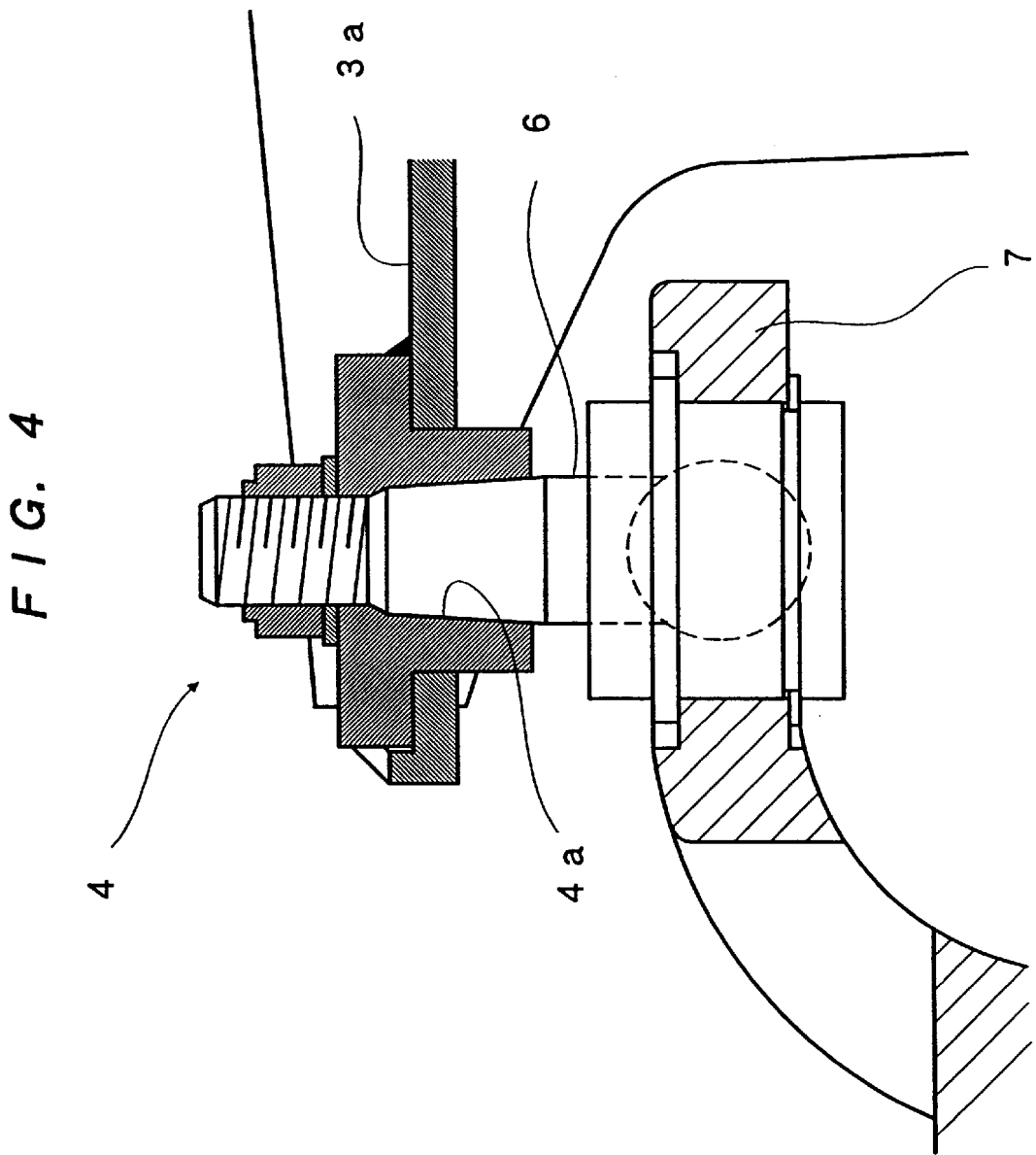
FIG. 4 is a cross-sectional view showing the upper holder, king pin and steering knuckle connected to each other in the power steering device illustrated in FIG. 1.

FIG. 4 shows how the upper holder 4, king pin 6 and steering knuckle 7 are connected to each other. As illustrated in FIG. 4, the upper holder 4 and the lower holder 5 (not shown in FIG. 4) have through-holes 4a, 5a for supporting king pins 6, 6. The through-holes 4a, 5a are upwardly tapered, i.e., the inner diameter of each through-hole 4a, 5a becomes gradually smaller from the lower part to the upper part. Inserted in the through-holes 4a, 5a are king pins 6, 6 whose outer surfaces are tapered so as to be in contact with the tapered through-holes. The lower ends of the king pins 6, 6 are rotatably supported via bearings by a steering knuckle 7 connected to a steering driving wheel 25.

Since the king pins 6, 6 are upwardly tapered so as to fit in the tapered through-holes of the holders 4, 5 fixed on the yoke member 3, the king pins 6, 6 can be more firmly secured to the holders 4, 5 by the weight of vehicle body.

A cylinder 8 for a power steering device is positioned in front of the front axle case 1 and fixed at one end by a first bracket 1a and at the other end by a second bracket 10. The second bracket 10 is removably fixed on the front axle case 1 with bolts or like fastening members. Bolt-insertion through-holes on the second bracket 10 are oblong in the longitudinal direction of the front axle case 1 so as to absorb dimensional errors of the parts, thus assuring appropriate assembly of the power steering device.

Attached to the outer ends 9a, 9a' of right and left piston rods 9, 9' are coupling members 12, 12' which cooperate with the piston rods 9, 9'. The piston rods 9, 9' are connected to tie rods 11, 11' via the coupling members 12, 12' in such a manner that the inner ends 11a, 11a' of the tie rods 11, 11' are located closer to the front axle case 1 than the outer ends 9a, 9a' of the piston rods 9, 9. By connecting the outer ends 9a, 9a' of the piston rods to the inner ends 11a, 11a' of the tie rods via the coupling members 12, 12' rathe than through direct connections therebetween, the following advantages are obtained.

In front-wheel drive vehicles, when a cylinder 8 is attached to a front axle case 1 accommodating a differential gear device 23, it is necessary to distance the cylinder from the front axle 2 to admit the dimension of the differential gear device 23 therebetween. According to conventional power steering devices, spacing the cylinder 8 from the axis of the front axle 2 increases an intersection angle between the axis of a piston rod 9 and the axis of a tie rod 11 connected thereto. This weakens the component of steering force in the axial direction of the piston rod 9, i.e., the force which is transmitted from the piston rod 9 to the tie rod 11 and contributes to steering of the steering driving wheel 25, thus deteriorating steering performance of the power steering device. At the same time, the component of the steering force perpendicular to the axis of the front axle 2 increases, and the reaction force perpendicular to the piston rod 9 increases, thus deteriorating durability of the power steering device.

By contrast, according to the power steering device of the embodiment of the invention, the outer end 9a of the piston rod 9 is connected via a coupling member 12 to the inner end 11a of the tie rod 11 in such a manner that the inner end 11a of the tie rod is located closer to the front axle 2. This arrangement makes the tie rod 11 extend closely in parallel to the piston rod 9 to make the intersection angle between the axes thereof small. This increases the component of steering force in axial direction of the piston rod 9, i.e., force transmitted from the piston rod 9 to the tie rod 11 and effective for steering the steering driving wheel 25, thus improving steering performance of the power steering device. At the same time, this minimizes the component of steering force perpendicular to the axis of the piston rod 9 and thus prevents a perpendicular reaction force on the piston rod 9 from reducing durability of the power steering device. In this way, even though the power steering device is separately arranged in front of the front axle case 1 accommodating the differential gear device, improved steering performance and high durability are achieved by arranging the tie rods 11 closer to the front axle 2.

In front of the cylinder 8, a guide bar 13 cooperating with a pair of right and left piston rods 9, 9' is provided along the axial direction of the piston rods. In this embodiment of the invention, the guide bar 13 is connected to coupling members 12, 12' so as to reduce the number of parts and to cooperate with the piston rods 9, 9'. The guide bar 13 is supported by the first and second brackets 1a, 10 so as to be slidable in the axial direction but immovable in the vertical direction. The guide bar 13 further improves steering performance and durability of the power steering device as shown below.

As already mentioned, the force in axial direction of the piston rod 9 is the force effective for steering the wheels. Without the guide bar 13, the axis of the piston rod 9 is likely to vertically deviate from that of the tie rod 11 so that steering force transmitted from the piston rod 9 will have a vertical component of force. The vertical component of force deteriorates steering performance of the power steering device, and the reaction force thereof deteriorates durability of the device. In this embodiment, these disadvantages are eliminated, that is, steering performance and durability of the power steering device are improved by providing the guide bar 13 and support members 40, 40' of the bar, the guide bar 13 being supported so as to extend closely in parallel to a pair of piston rods 9, 9', the support members 40, 40' being attached to the axle case 1 and extending to the guide bar 13 so as to support the guide bar 13 in such a way that the guide bar 13 is slidable in parallel with the piston rods but not tiltable vertically. Each support member can be made of a member different from the bracket, as the first bracket 1a, or can be integrally formed with the bracket as the second bracket 10. To minimize vertical components of steering force, the tie rods 11, piston rods 9 and guide bar 13 are preferably contained in a common horizontal plane.

The power steering device of this embodiment effectively suppresses components of steering force in any other direction than the axial direction of the piston rods, thus improving steering performance and durability. Furthermore, since the cylinder 8 is attached to the front axle case 1 by means of the first bracket 1a and the removably attached second bracket 10, work efficiency is improved in attachment of the power steering device as well as in maintenance.

Figure 5:
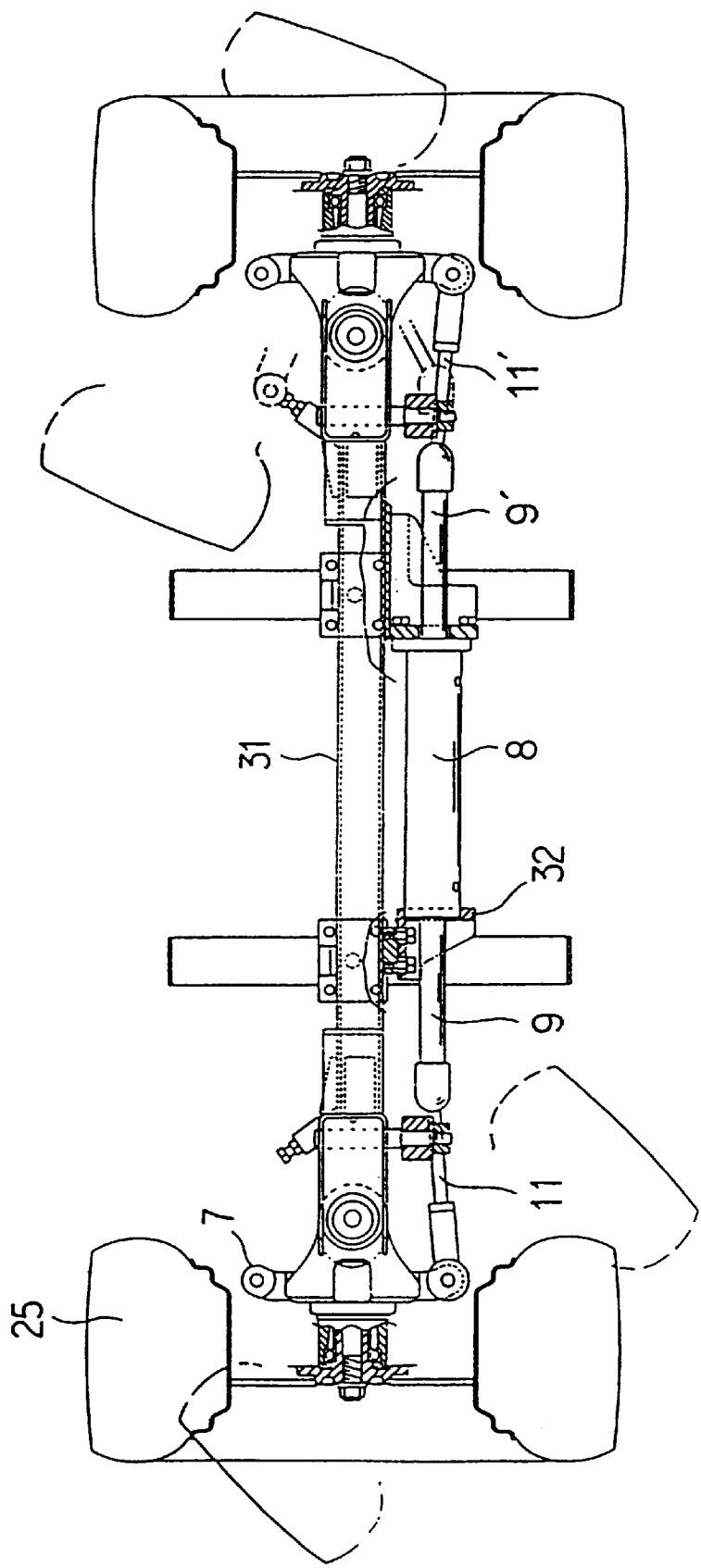
FIG. 5 is a partial cross-sectional plan view of a power steering device for rear-wheel drive vehicles.
Figure 6:
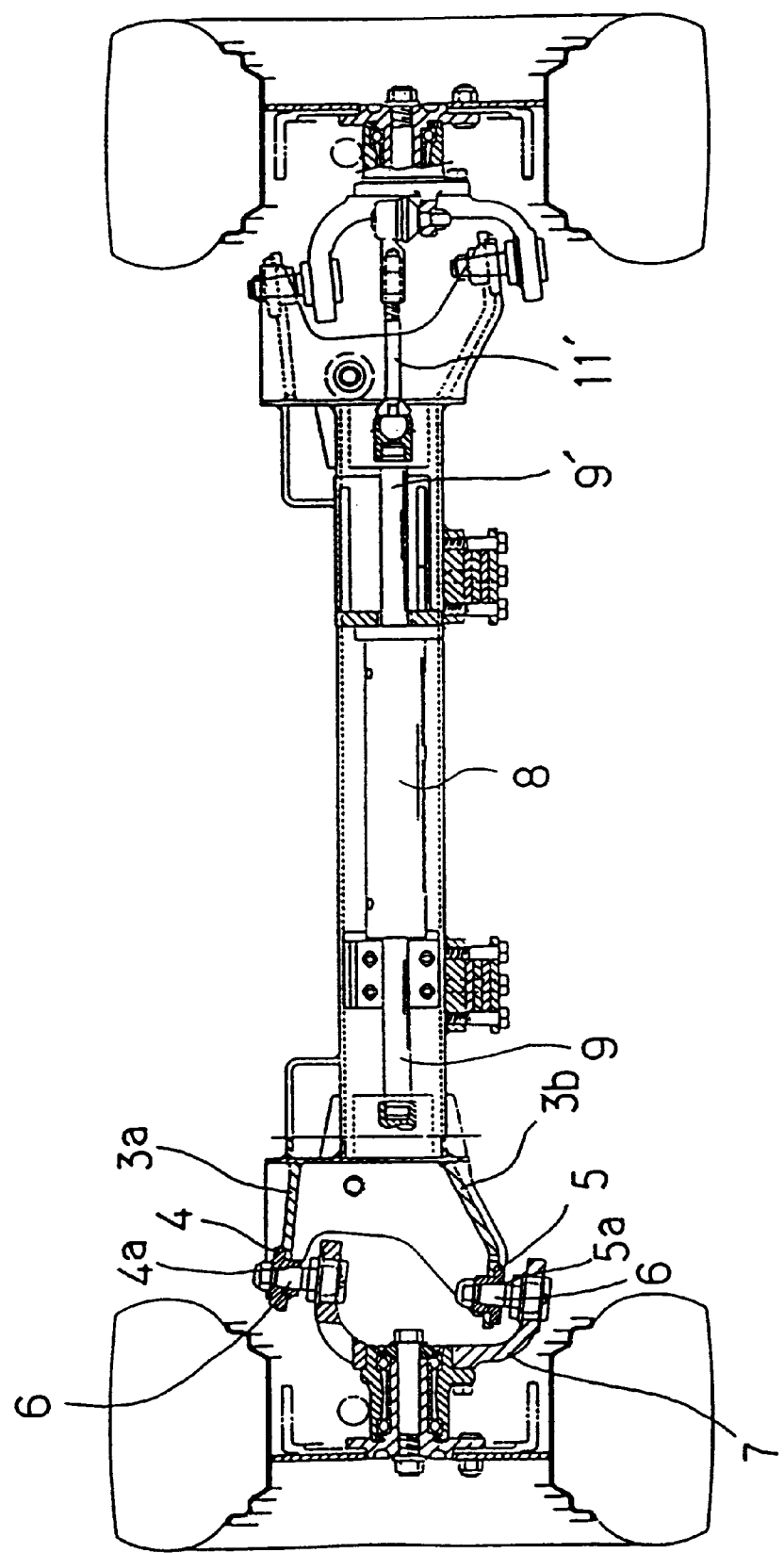
FIG. 6 is a partial cross-sectional front elevation of the power steering device illustrated in FIG. 5.

Another advantage of the power steering device of this embodiment is that the parts can be used in non-front-wheel drive vehicles as well as in front-wheel drive vehicles. FIGS. 5 and 6 are a plan view and a front elevation illustrating a supporting mechanism of a power steering device for rear-wheel drive vehicles.

With use of a front axle case 31 for rear-wheel drive vehicles as shown in FIGS. 5 and 6, namely, a front axle case having a first bracket integrated therewith, wheel parts such as steering knuckles 7 can be commonly used in any types of vehicles such as front-wheel drive vehicles, rear-wheel drive vehicles and four-wheel drive vehicles. As a result, cost reduction of vehicles can be achieved.

What is claimed is:

1. A power steering device for vehicles which comprises:
   an axle case for housing a differential gear device and a pair of right and left axles extending from the differential gear device;
   a first bracket attached to the axle case and extending therefrom in one direction longitudinal of the vehicle body;
   a second bracket spaced from the first bracket axially of the axle case and attached to the axle case so as to extend in the same direction as the first bracket;
   a wheel steering generator positioned at said longitudinal direction side relative to the axle case and comprising a cylinder and a pair of right and left piston rods projecting from the cylinder;
   the cylinder being supported in parallel to the axis of the axles by the first and second brackets;
   steering knuckles supported at their outer ends by steering wheels and connected at their inner ends to the axle case rotatably around king pins;
   tie rods connected at their outer ends to the inner ends of the steering knuckles and extending at their inner ends towards the inner ends of the axles;
   coupling members for the tie rods and the piston rod, each coupling member provided in parallel with said longitudinal direction and having first and second connecting points at a designated interval, said first connecting point being located closer to the axle than is said second connecting point, wherein the inner end of the tie rod is rotatably connected to the first connecting point, and the outer end of the piston rod is connected to the second connecting point
   a guide bar positioned in parallel with the pair of piston rods and fixed thereto to cooperate with the piston rods; and
   support members attached to the axle case and extending to the guide bar so as to support the guide bar in such a way that the guide bar is slidable with the piston rods but not tiltable vertically.

2. A power steering device for vehicles according to claim 1, wherein the first bracket is integrated as part of the axle case and the second bracket is removably attached to the axle case.

3. A power steering device for vehicles according to claim 1, wherein the guide bar is connected to the piston rods via the coupling members and supported by support members attached to the first and second brackets so as not to be tiltable vertically.

4. A power steering device for vehicles according to claim 1, wherein the differential gear device housing of the axle case is made of cast-metal and yoke members connected to the steering knuckles are made of metal plates.

5. A power steering device for vehicles according to claim 4, wherein each steering knuckle and each yoke member have upper and lower arms and are U-shaped in front view,
   the upper and lower arms of the steering knuckle being connected via king pins to lower sides of the upper and lower arms of the yoke member so as to be horizontally rotatable, the king pins being supported by holders fixed on the upper and lower arms of the yoke member,
   the outer surface of the king pins being upwardly tapered and the inner surface of king pin-insertion through-holes on the holders being tapered so as to be in contact with the tapered outer surface of the king pins.

6. A power steering device for vehicles according to claim 5 wherein the holders have outward flanges and are securely fixed to the yoke member with the flanges being in contact with the upper surface of the upper arm of the yoke member and the lower surface of the lower arm of the same.

7. A power steering device for vehicles according to claim 1 wherein the tie rods, piston rods and guide bar are contained in a common horizontal plane.

8. A power steering device for vehicles which comprises:
   an axle case integrally provided with a pair of right and left extending axle housings, a differential gear housing communicating with the inner ends of the axle housings via radially expanding portions and having a larger diameter than the axle housings, and a first bracket 1a projecting forward or backward from one expanding portion;
   a second bracket removably attached at the side of the other expanding portion so as to project in the same direction as the first bracket;
   a wheel steering generator comprising a cylinder and a pair right and left piston rods projecting from the cylinder and imparting a steering force to the steering wheels in response to steering operation,
   the cylinder being supported in parallel to the axis of the axles by the first and second brackets;
   steering knuckles supported at their outer ends by the steering wheels and connected at their inner ends to the axle case rotatably around king pins;

tie rods connected at their outer ends to the inner ends of the steering knuckles and extending at their inner ends towards the inner ends of the axles; and coupling members for coupling the tie rods and the piston rod, each coupling member provided in parallel with said longitudinal direction and having first and second connecting points at a designated interval, said first connecting point being located closer to the axle than is said second connecting point, wherein the inner end of the tie rod is rotatably connected to the first connecting point, and the outer end of the piston rod is connected to the second connecting point.

* * * * *